(12) United States Patent
Hsu et al.

(10) Patent No.: US 10,836,271 B2
(45) Date of Patent: *Nov. 17, 2020

(54) CHARGING SYSTEM AND CHARGING METHOD

(71) Applicant: PixArt Imaging Inc., Hsin-Chu (TW)

(72) Inventors: En-Feng Hsu, Hsin-Chu (TW); Ting-Yang Chang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/583,241

(22) Filed: Sep. 25, 2019

(65) Prior Publication Data
US 2020/0021334 A1    Jan. 16, 2020

Related U.S. Application Data

(63) Continuation of application No. 15/481,445, filed on Apr. 6, 2017, now Pat. No. 10,457,152.

(30) Foreign Application Priority Data

Oct. 13, 2016    (TW) .............................. 105132974 A (51) Int. Cl.
*B60L 53/37* (2019.01)
*H04B 5/00* (2006.01)
*B60L 53/38* (2019.01)

(52) U.S. Cl.
CPC .............. *B60L 53/37* (2019.02); *B60L 53/38* (2019.02); *H04B 5/0031* (2013.01); *H04B 5/0037* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ..... H04B 5/0031; H04B 5/0037; B60L 53/12; B60L 53/37; B60L 53/38; Y02T 90/122; Y02T 90/125; Y02T 90/14; Y02T 10/7005; Y02T 90/121; Y02T 10/7072; Y02T 90/12
USPC ......................................................... 320/108
See application file for complete search history.

(56) References Cited

U.S. PATENT DOCUMENTS

| 5,596,567 | A | * | 1/1997 | deMuro | .............. | H02J 7/00047 320/106 |
| 6,045,233 | A | * | 4/2000 | Iwai | ...................... | G01D 11/28 116/202 |
| 7,679,671 | B2 | * | 3/2010 | Tanaka | .................. | G03B 15/03 348/370 |

(Continued)

FOREIGN PATENT DOCUMENTS

| CN | 102209647 A | 10/2011 |
| CN | 103022586 A | 4/2013 |

(Continued)

*Primary Examiner* — M Baye Diao
(74) *Attorney, Agent, or Firm* — Winston Hsu (57) ABSTRACT

A charging system comprising: a charging apparatus; and at least one guiding apparatus, comprising at least one light emitting device provided in at least one target apparatus. The charging apparatus moves to a charging location according a light emitting state of the light emitting device, to charge the target apparatus. The charging apparatus further receives battery power information from the target apparatus via wireless communication.

14 Claims, 8 Drawing Sheets

(56) References Cited

U.S. PATENT DOCUMENTS

| | | | | |
|---|---|---|---|---|
| 7,865,236 B2* | 1/2011 | Cory | ............... | A61B 5/0536 |
| | | | | 600/547 |
| 8,610,554 B2 | 12/2013 | Liu | | |
| 8,699,035 B2* | 4/2014 | Jimbo | ............... | G02F 1/13471 |
| | | | | 356/614 |
| 8,723,642 B2* | 5/2014 | Park | ............... | H02J 7/0044 |
| | | | | 340/5.8 |
| 9,170,353 B2* | 10/2015 | Chang | ............... | A47G 1/02 |
| 9,173,545 B2* | 11/2015 | Schoonbaert | ...... | A61B 1/00052 |
| 9,197,093 B2* | 11/2015 | Sagata | ............... | B60L 53/36 |
| 9,203,464 B2* | 12/2015 | Kim | ............... | H04B 1/707 |
| 9,236,759 B2* | 1/2016 | Park | ............... | H02J 7/0047 |
| 9,455,585 B2* | 9/2016 | Park | ............... | H02J 7/02 |
| 9,746,138 B1* | 8/2017 | Thomas | ............... | F21V 23/06 |
| 9,941,748 B2* | 4/2018 | Lucrecio | ............... | H02J 7/025 |
| 2013/0107023 A1* | 5/2013 | Tanaka | ............... | H04B 5/0037 |
| | | | | 348/51 |
| 2013/0201316 A1* | 8/2013 | Binder | ............... | H04L 67/12 |
| | | | | 348/77 |
| 2014/0180511 A1* | 6/2014 | Daum | ............... | B60W 20/00 |
| | | | | 701/22 |
| 2014/0218972 A1* | 8/2014 | Lin | ............... | G02B 6/0008 |
| | | | | 362/616 |
| 2015/0102776 A1* | 4/2015 | Said | ............... | H05B 45/10 |
| | | | | 320/109 |
| 2016/0269112 A1* | 9/2016 | Guo | ............... | H05B 47/105 |
| 2016/0283980 A1* | 9/2016 | Lee | ............... | G09F 19/18 |
| 2016/0294226 A1 | 10/2016 | Kim | | |
| 2017/0019180 A1* | 1/2017 | Lucrecio | ............... | H04B 10/1143 |

FOREIGN PATENT DOCUMENTS

| | | |
|---|---|---|
| CN | 103560549 A | 2/2014 |
| CN | 104836293 A | 8/2015 |
| CN | 104999921 A | 10/2015 |
| CN | 205583292 U | 9/2016 |
| CN | 205637775 U | 10/2016 |
| CN | 106257368 A | 12/2016 |
| TW | 200731638 | 8/2007 |
| TW | 201104999 A1 | 2/2011 |
| WO | 2015/115121 A1 | 8/2015 |

* cited by examiner

CHARGING SYSTEM AND CHARGING METHOD

CROSS REFERENCE TO RELATED APPLICATIONS

This application is a continuation of applicant's earlier application, Ser. No. 15/481,445, filed 2017 Apr. 6, and is included herein by reference.

BACKGROUND OF THE INVENTION

1. Field of the Invention

The present invention relates to a charging system and a charging method, and particularly relates to a charging system and a charging method which can automatically charge.

2. Description of the Prior Art

Recently, a vehicle which applies electric power, for example, an electric motorcycle or an electric car, is more and more popular. Such vehicle should be moved to a particular position if it is to be charged. Alternatively, a charging apparatus should be provided to each position. However, such charging method is not convenient for the user. Also, the charging apparatus increases the cost.

SUMMARY OF THE INVENTION

Therefore, one objective of the present invention is to provide a charging system which can automatically charge a target apparatus.

Another objective of the present invention is to provide a charging method which can control the charging apparatus to automatically charge a target apparatus.

One embodiment of the present invention discloses a charging system comprising: a charging apparatus; and at least one guiding apparatus, comprising at least one light emitting device provided in at least one target apparatus. The charging apparatus moves to a charging location according a light emitting state of the light emitting device, to charge the target apparatus. The charging apparatus further receives battery power information from the target apparatus via wireless communication.

Another embodiment of the present invention discloses a charging system comprising: a charging apparatus, comprising at least one light emitting device; and a guiding apparatus, provided in at least one target apparatus. The guiding apparatus moves the charging apparatus to the charging location according to a light emitting state of the light emitting device, to charge the target apparatus. The charging apparatus further receives battery power information from the target apparatus via wireless communication.

Corresponding charging methods can be acquired based on above-mentioned embodiments. Details for the charging methods are omitted for brevity here.

In view of above-mentioned embodiments, the charging apparatus can automatically charge the target apparatus, and firstly charges the target apparatus having low battery power. The inconvenience for charging a vehicle applying electric power can be improved.

These and other objectives of the present invention will no doubt become obvious to those of ordinary skill in the art after reading the following detailed description of the preferred embodiment that is illustrated in the various figures and drawings.

DETAILED DESCRIPTION

In following descriptions, several embodiments are provided to explain contents of the present application. Please note, the devices or apparatuses illustrated in following descriptions can be implemented by hardware (ex. circuit or machine), or hardware with software (ex. writing programs to a processor). Additionally, in following embodiments, a car is applied as an example for explaining. However, the car can be replaced by other apparatuses which need to be charged. Furthermore, two light emitting devices are applied as examples for explaining, but the number for the light emitting devices can be other values.

Figure 1:
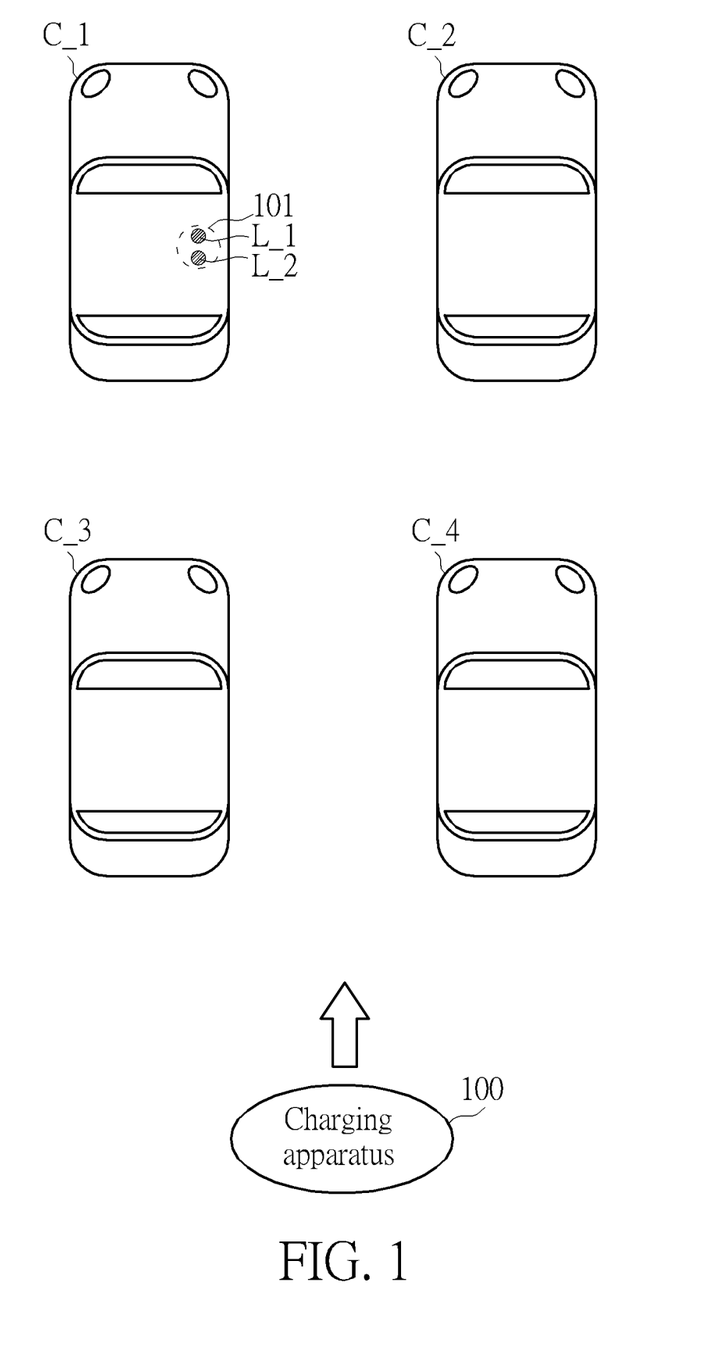
FIG. 1 is a schematic diagram illustrating a charging system according to one embodiment of the present invention.

FIG. 1 is a schematic diagram illustrating a charging system according to one embodiment of the present invention. In FIG. 1, a plurality of cars $C\_1$, $C\_2$, $C\_3$ and $C\_4$ which are parking are illustrated. In following embodiments, only the car $C\_1$ is applied as an example for explaining. However, cars $C\_2$, $C\_3$, $C\_4$ can apply the same mechanisms. A guiding apparatus 101 is provided under the car $C\_1$, which comprises light emitting devices $L\_1$, $L\_2$. The charging apparatus 100 moves to a charging location according a light emitting state of the light emitting devices $L\_1$, $L\_2$, to charge the car $C\_1$. In following descriptions, different embodiments are provided to describe how the charging apparatus 100 charges the car $C\_1$ according to a light emitting state of light emitting devices $L\_1$, $L\_2$.

Figure 2:
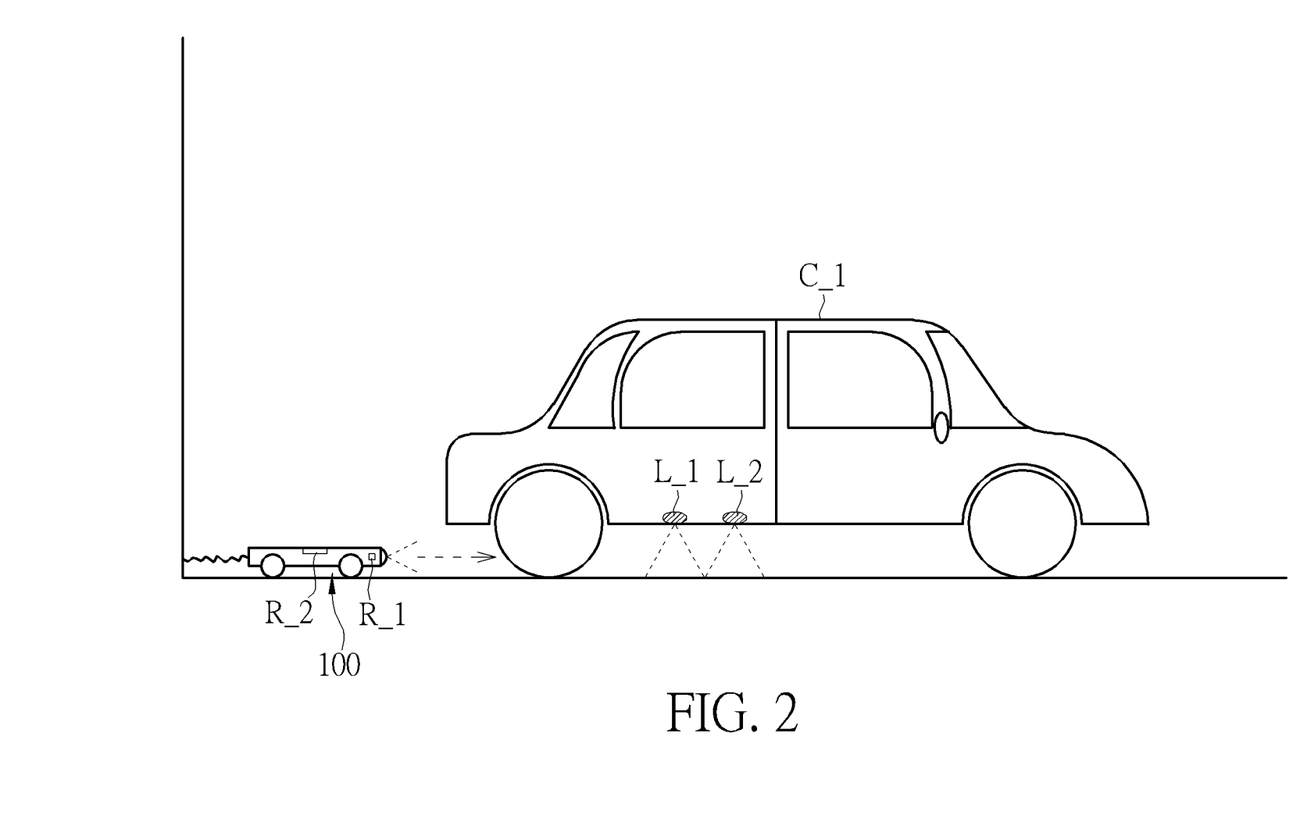
FIGS. 2-6 are schematic diagrams illustrating operations for charging systems according to embodiments of the present application.
Figure 3:
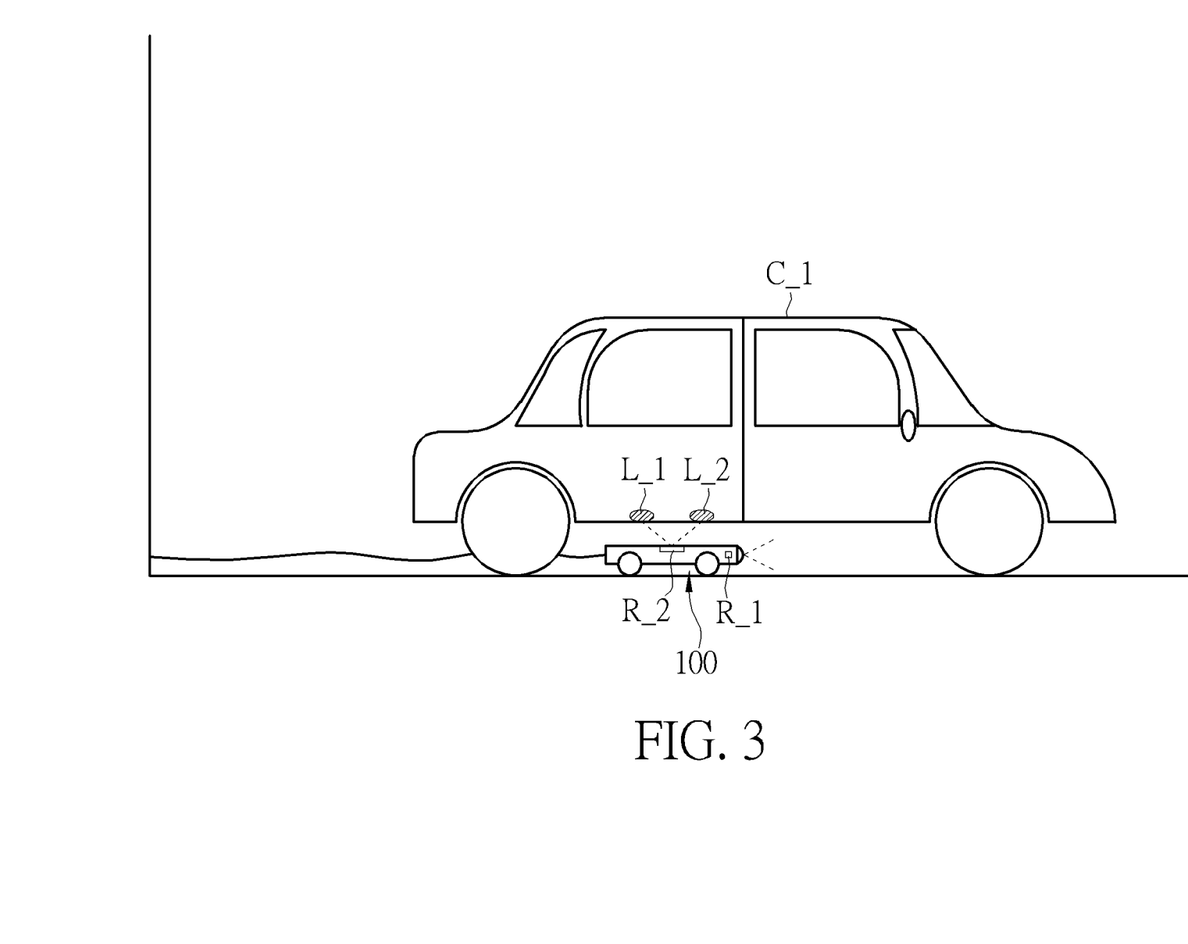

FIGS. 2-6 are schematic diagrams illustrating operations for charging systems according to embodiments of the present application. As illustrated in FIG. 2, in one embodiment, the charging apparatus 100 comprises a front camera $R\_1$ and an upper camera $R\_2$. The step that the charging apparatus 100 moves to a charging location according a light emitting state of the light emitting device $L\_1$, $L\_2$ comprises: the charging apparatus 100 moves to a temporary location according to locations of the light emitting devices $L\_1$, $L\_2$ via the front camera $R\_1$ (as shown in FIG. 2); and the charging apparatus 100 moves from the temporary location to the charging location according to a light emitting pattern of the light emitting devices $L\_1$, $L\_2$ via the upper camera $R\_2$ (as shown in FIG. 3). The light emitting pattern for light emitting devices $L\_1$, $L\_2$ can comprise at least one for following kinds of information: the arrangement of light emitting devices, the shape or the light emitting frequency of the light emitting device itself.

For more detail, the charging apparatus 100 determines a rough location of the light emitting devices $L\_1$, $L\_2$ according to a location for light from light emitting devices L_1, L_2, and moves to this rough location as a temporary location. After that, the temporary location is adjusted to acquire the charging location, according to the arrangement of light emitting devices, the shape or the light emitting frequency of the light emitting device itself, via the upper camera R_2. In one embodiment, the temporary location is not adjusted but directly applied as the charging location. In other words, this embodiment determines if the charging apparatus is at a proper location for charging according to location images for light emitting devices L_1, L_2 captured by the upper camera R_2.

Figure 4:
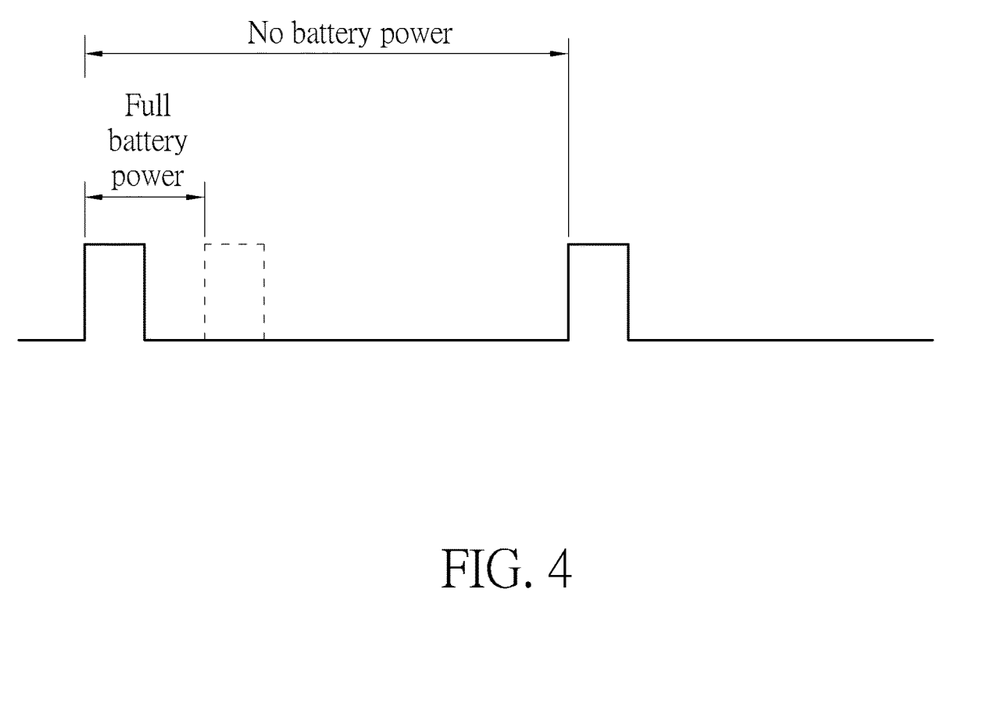
Figure 5:
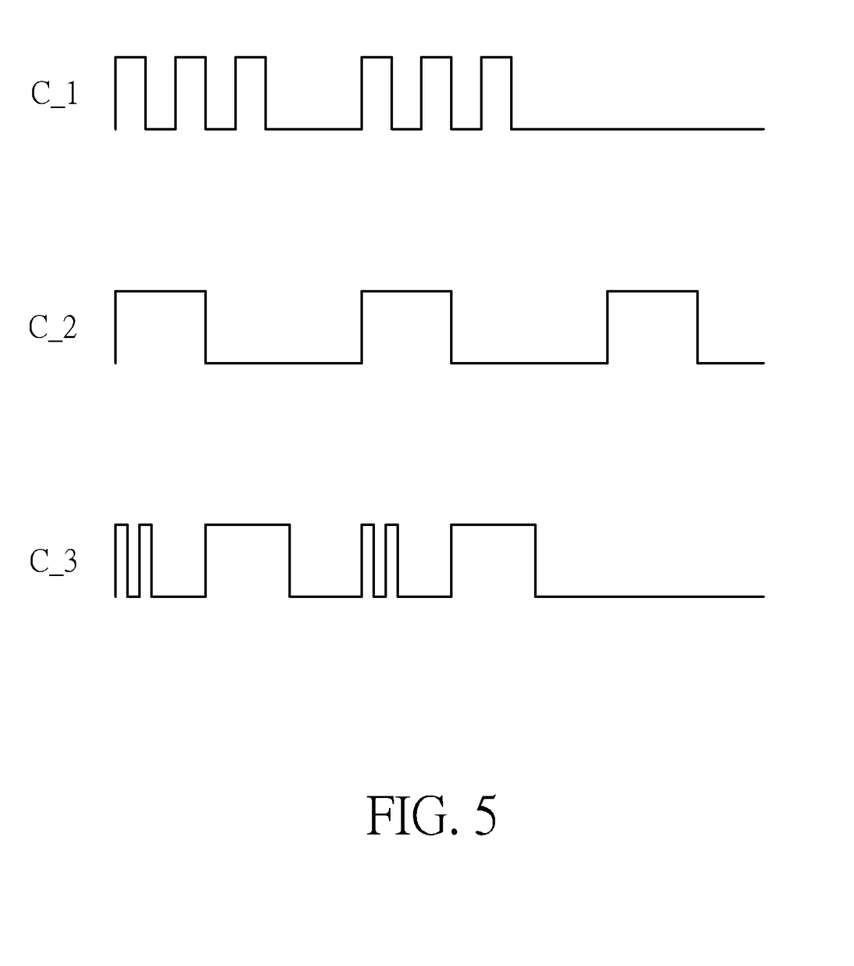

Additionally, in one embodiment, the charging apparatus 100 further determines a battery power of the car according to a light emitting pattern of the light emitting devices L_1, L_2. As illustrated in FIG. 4, the car C_1 has sufficient battery power if the light emitting frequencies for light emitting devices L_1, L_2 are high, which can mean continuously emitting light. On the opposite, the car C_1 has low battery power if the light emitting frequencies for light emitting devices L_1, L_2 are low. Please note, FIG. 4 is only for example and does not mean to limit the light emitting pattern to the example illustrated in FIG. 4.

The light emitting pattern for a light emitting device can be applied to transmit information besides battery power. In one embodiment, the light emitting pattern is applied as identification information of the car. Please refer to FIG. 1 and FIG. 5, in FIG. 5 the light emitting pattern for light emitting devices in the car C_1 is: continuous three times of short period light emitting, and then continuous three times of short period light emitting. Also, the light emitting pattern for light emitting devices in the car C_2 is: a long period light emitting, stop for a while, and then a long period light emitting again. Besides, the light emitting pattern for light emitting devices in the car C_3 is: the long period light emitting and the short period light emitting alternatively occur. By this way, the charging apparatus 100 can accurately determine which car should be charged. Please note, as above-mentioned, the light emitting pattern can indicate the arrangement for light emitting devices, or the shape for the light emitting device itself. The charging apparatus 100 can determine which car should be charged according to these parameters as well.

In one embodiment, the charging apparatus can acquire battery power information by method besides the light emitting pattern. For example, the charging apparatus can receive battery power information or identification information from the car via wireless communication such a RF (radio frequency).

Figure 6:
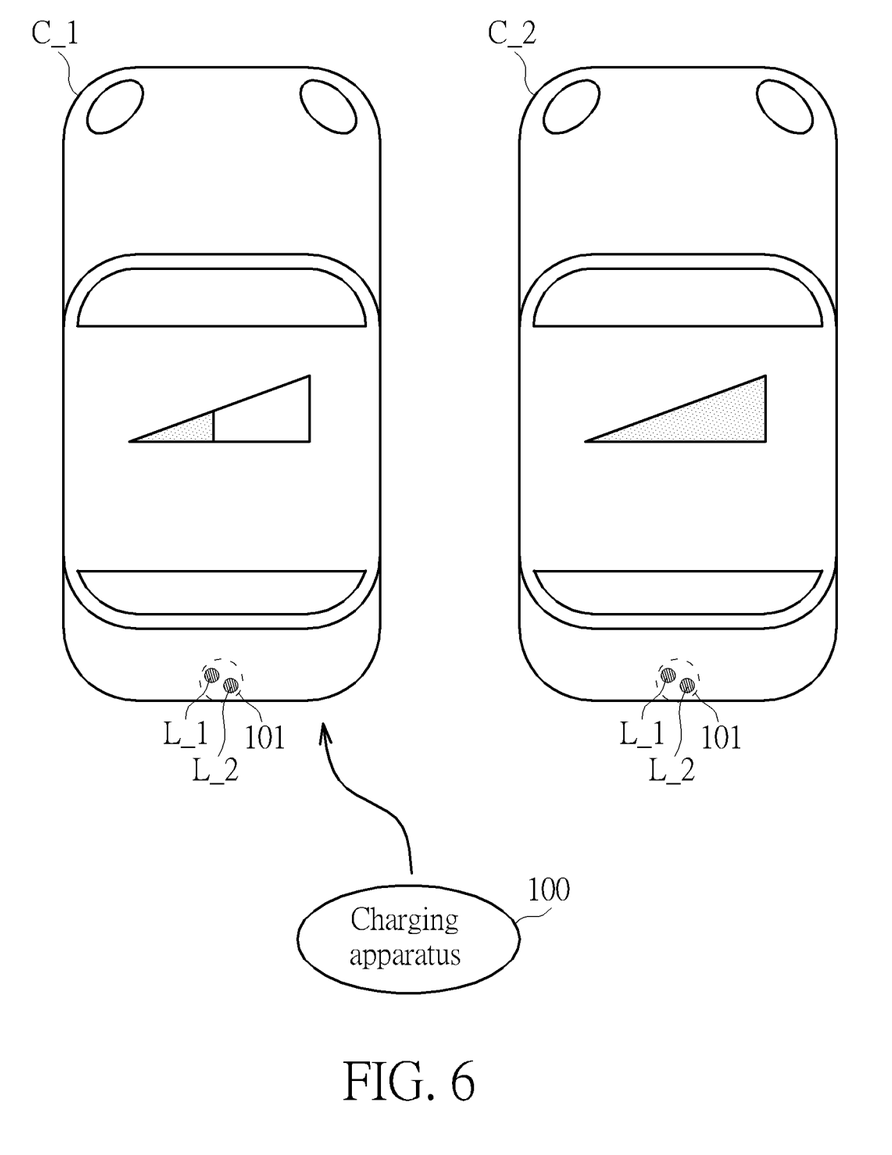

FIG. 6 is a schematic diagram illustrating the charging apparatus firstly charges a car with lower batter power. As illustrated in FIG. 6, the charging apparatus firstly charges a car with lower batter power after receives the battery power information according to a light emitting pattern of light emitting devices L_1, L_2 or other methods. By this way, the car with lower batter power can have a higher priority for charging, such that each car can have a necessary battery and operate smoothly.

Figure 7:
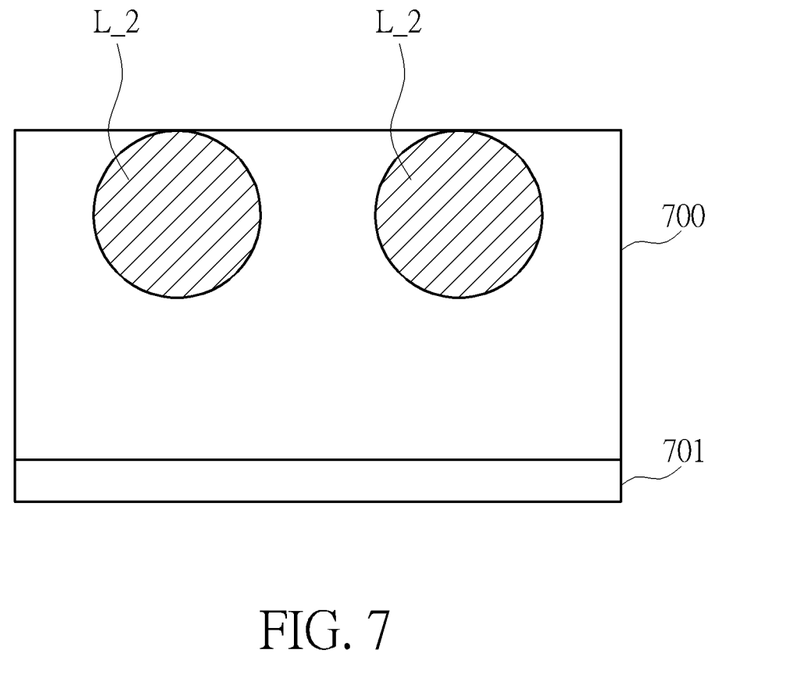
FIG. 7 is a schematic diagram illustrating a guiding apparatus according to one embodiment of the present application.

FIG. 7 is a schematic diagram illustrating a guiding apparatus according to one embodiment of the present invention. As illustrated in FIG. 7, the guiding apparatus 700 comprises a cover 701, which is in a close state if the car is in a normal mode (ex. the car is activated). By this way, light emitting devices L_1, L_2 or other devices for the guiding apparatus 701 such as a light emitting device controller will not be polluted by dust or dirty water. On the contrary, the cover 701 is in an open state if the car is in a to-be-charged mode (ex. in a non-activated state), such that the charging apparatus can detect light from light emitting devices L_1, L_2. In one embodiment, the car comprises a button provided therein, which can control the cover 701 to close or open.

As above-mentioned, the car can be replaced by other electronic apparatuses. Accordingly, the embodiments in FIG. 1-FIG. 6 can be summarized as: a charging system, comprising: a charging apparatus (ex. the charging apparatus 100 in FIGS. 1-3); and at least one guiding apparatus, comprising at least one light emitting device provided in at least one target apparatus (ex. light emitting devices L_1, L_2 in FIG. 2, FIG. 3, and provided in the car C_1 in FIGS. 1-3). The charging apparatus moves to a charging location according a light emitting state of the light emitting device, to charge the target apparatus.

Figure 8:
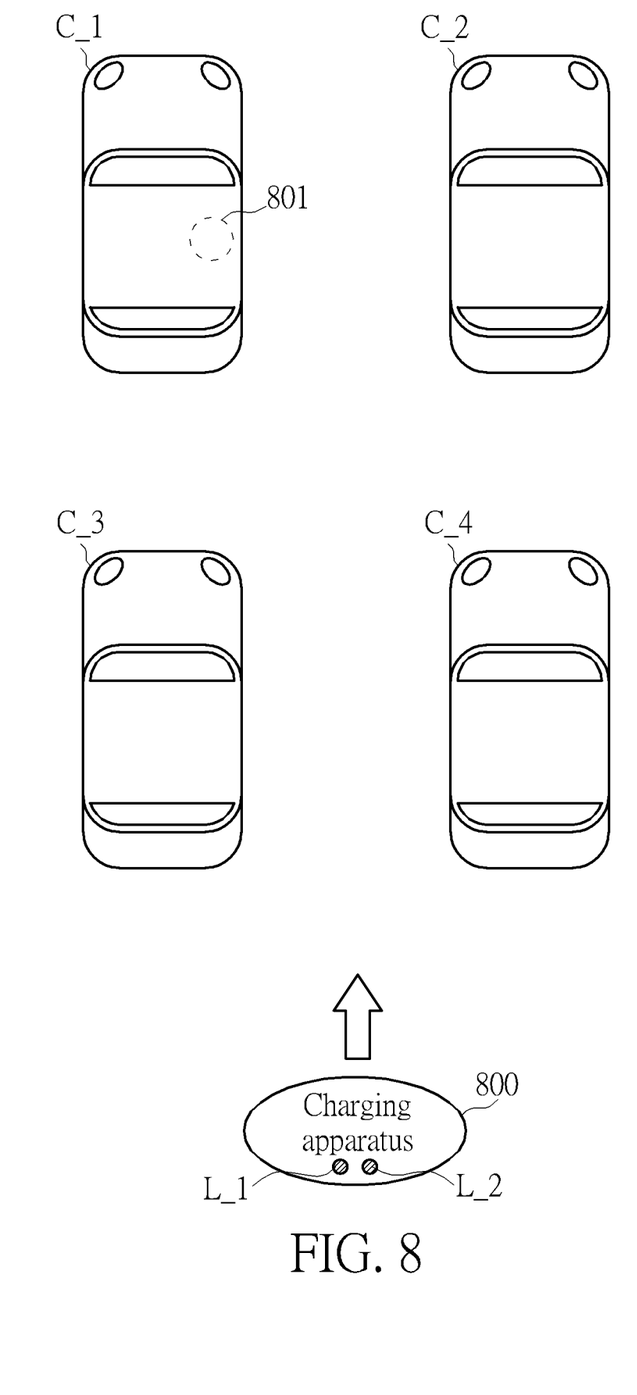
FIG. 8 is a schematic diagram illustrating a charging system according to another embodiment of the present application.

The light emitting device it not limited to be provided in the target apparatus, it can be provided to the charging apparatus as well. FIG. 8 is a schematic diagram illustrating a charging system according to another embodiment of the present application. As illustrated in FIG. 8, the light emitting devices L_1, L_2 are provided to the charging apparatus 800 rather than the guiding apparatus 801 in the car C_1. In this embodiment, the guiding apparatus 801 moves the charging apparatus 800 to the charging location according to a light emitting state of the light emitting devices L_1, L_2, to charge the car. For more detail, the guiding apparatus determines a location of the charging apparatus according to locations or light emitting patterns for the light emitting devices L_1, L_2, and accordingly moves the charging apparatus 800 to a charging location.

In such embodiment, many methods can be applied for communication between the guiding apparatus and the charging apparatus 800. For example, the guiding apparatus can communicate with the charging apparatus 800 via wireless communication. Also, in such embodiment, the charging apparatus 800 can receive power information from the car via wireless communication. Also, the guiding apparatus can comprise the cover illustrated in FIG. 7.

In view of above-mentioned embodiments, the car can be replaced by other apparatuses. Accordingly, the embodiment illustrated in FIG. 8 can be summarized as: A charging system, comprising: a charging apparatus (ex. 800), comprising at least one light emitting device; and a guiding apparatus (ex. 801), provided in at least one target apparatus. The guiding apparatus moves the charging apparatus to the charging location according to a light emitting state of the light emitting device, to charge the target apparatus.

In view of the embodiments illustrated in FIGS. 1-6, a charging method can be acquired, which can be applied to a charging system illustrated in FIG. 1. The charging method comprises: detecting a light emitting state of the light emitting device; and moving the charging apparatus to a charging location according a light emitting state of the light emitting device, to charge the target apparatus.

Additionally, in view of the embodiment illustrated in FIG. 8, a charging method can be acquired, which can be applied to a charging system illustrated in FIG. 8. The charging method comprises: detecting a light emitting state of the light emitting device; and moves the charging apparatus to the charging location according to a light emitting state of the light emitting device, to charge the target apparatus. Detail steps for these two methods are illustrated in above-mentioned embodiments, thus are omitted for brevity here.

In view of above-mentioned embodiments, the charging apparatus can automatically charge the target apparatus, and firstly charges the target apparatus having low battery power. The inconvenience for charging a vehicle applying electric power can be improved.

It will be appreciated that the above-mention charging can be implemented by wireless charging. That is, if the charging apparatus moves to a suitable location, the target apparatus can be charged by a wireless method without physically touching the target apparatus. Additionally, the charging apparatus can be wiredly connected to a constant power source such as mains electricity. In one embodiment, the charging apparatus comprises a power source itself (ex. a battery), thus does not need to be wiredly connected to an outer power source. Additionally, the charging apparatus can be wirelessly charged by an outer power source. By this way, the application range for the charging apparatus is large, and will not be jammed by wires wire moving.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A charging system, comprising:
a charging apparatus; and
at least one guiding apparatus, comprising at least one light emitting device provided in at least one target apparatus;
wherein the charging apparatus moves to a charging location according a light emitting state of the light emitting device, to charge the target apparatus;
wherein the charging apparatus further receives battery power information from the target apparatus via wireless communication;
wherein the charging apparatus further determines a battery power of the target apparatus according to a light emitting frequency of the light emitting device.

2. The charging system of claim 1, wherein the charging apparatus further determines identification information of the target apparatus according to a number of continuous light emissions.

3. The charging system of claim 1, wherein the charging apparatus further determines identification information of the target apparatus according to the light emitting frequency.

4. The charging system of claim 1, wherein the charging apparatus further determines identification information of the target apparatus according to if long period light emitting and short period light emitting alternatively occurs.

5. A charging method, applied to a charging system comprising a charging apparatus and a guiding apparatus comprising at least one light emitting device provided in at least one target apparatus, the charging method comprises:
detecting a light emitting state of the light emitting device; and
moving the charging apparatus to a charging location according a light emitting state of the light emitting device, to charge the target apparatus;
controlling the charging apparatus to receive battery power information from the target apparatus via wireless communication; and
determining a battery power of the target apparatus according to a light emitting frequency of the light emitting device.

6. The charging method of claim 5, further comprising:
determining identification information of the target apparatus according to a number of continuous light emissions.

7. The charging method of claim 5, further comprising:
determining identification information of the target apparatus according to the light emitting frequency.

8. The charging method of claim 5, further comprising:
determines identification information of the target apparatus according to if long period light emitting and short period light emitting alternatively occurs.

9. A charging system, comprising:
a charging apparatus; and
at least one guiding apparatus, comprising at least one light emitting device provided in at least one target apparatus;
wherein the charging apparatus moves to a charging location according a light emitting state of the light emitting device, to charge the target apparatus;
wherein the charging apparatus further receives battery power information from the target apparatus via wireless communication;
wherein the charging apparatus further determines identification information of the target apparatus according to a number of continuous light emissions.

10. A charging system, comprising:
a charging apparatus; and
at least one guiding apparatus, comprising at least one light emitting device provided in at least one target apparatus;
wherein the charging apparatus moves to a charging location according a light emitting state of the light emitting device, to charge the target apparatus;
wherein the charging apparatus further receives battery power information from the target apparatus via wireless communication;
wherein the charging apparatus further determines identification information of the target apparatus according to a light emitting frequency of the light emitting device.

11. A charging system, comprising:
a charging apparatus; and
at least one guiding apparatus, comprising at least one light emitting device provided in at least one target apparatus;
wherein the charging apparatus moves to a charging location according a light emitting state of the light emitting device, to charge the target apparatus;
wherein the charging apparatus further receives battery power information from the target apparatus via wireless communication;
wherein the charging apparatus further determines identification information of the target apparatus according to if long period light emitting and short period light emitting alternatively occurs.

12. A charging method, applied to a charging system comprising a charging apparatus and a guiding apparatus comprising at least one light emitting device provided in at least one target apparatus, the charging method comprises:
detecting a light emitting state of the light emitting device; and
moving the charging apparatus to a charging location according a light emitting state of the light emitting device, to charge the target apparatus;
controlling the charging apparatus to receive battery power information from the target apparatus via wireless communication; and determining identification information of the target apparatus according to a number of continuous light emissions.

13. A charging method, applied to a charging system comprising a charging apparatus and a guiding apparatus comprising at least one light emitting device provided in at least one target apparatus, the charging method comprises:
  detecting a light emitting state of the light emitting device; and
  moving the charging apparatus to a charging location according a light emitting state of the light emitting device, to charge the target apparatus;
  controlling the charging apparatus to receive battery power information from the target apparatus via wireless communication; and
  determining identification information of the target apparatus according to a light emitting frequency of the light emitting device.

14. A charging method, applied to a charging system comprising a charging apparatus and a guiding apparatus comprising at least one light emitting device provided in at least one target apparatus, the charging method comprises:
  detecting a light emitting state of the light emitting device; and
  moving the charging apparatus to a charging location according a light emitting state of the light emitting device, to charge the target apparatus; and
  controlling the charging apparatus to receive battery power information from the target apparatus via wireless communication; and
  determining identification information of the target apparatus according to if long period light emitting and short period light emitting alternatively occurs.

* * * * *